(No Model.) 2 Sheets—Sheet 1.
J. R. VELLACOTT.
VALVE AND VALVE GEAR FOR STEAM PUMPS.
No. 273,645. Patented Mar. 6, 1883.
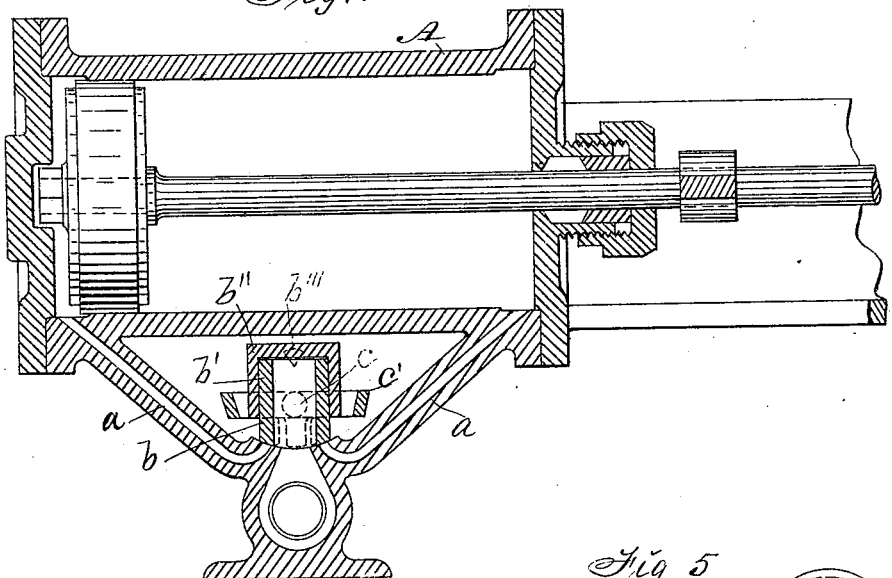
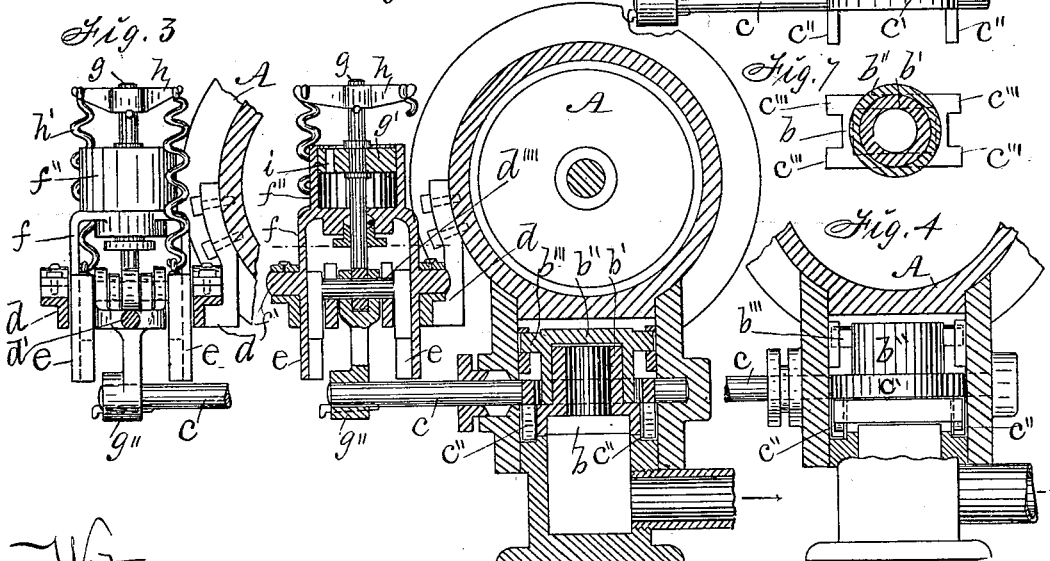
Witnesses:
H. A. Stollenberg.
J. B. Halek.
Inventor:
James R. Vellacott,
By Thomas G. Orwig, Atty.

(No Model.) 2 Sheets—Sheet 2.
J. R. VELLACOTT.
VALVE AND VALVE GEAR FOR STEAM PUMPS.
No. 273,645. Patented Mar. 6, 1883.
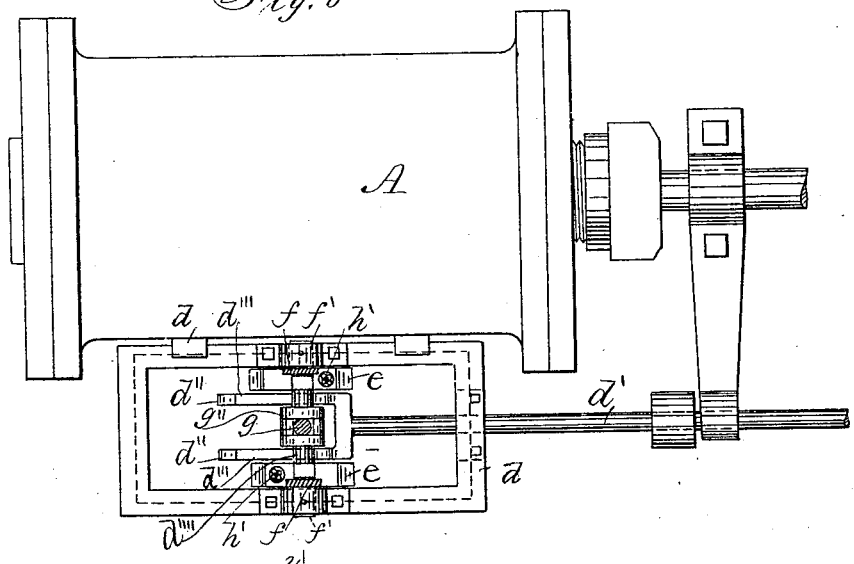
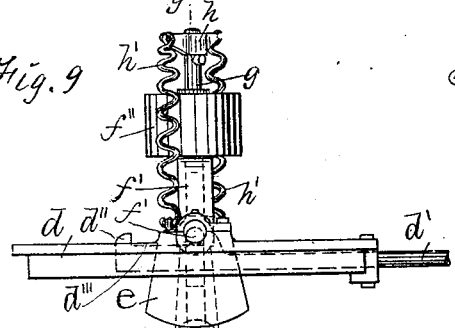
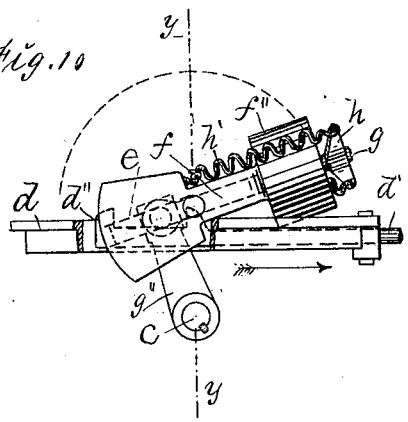
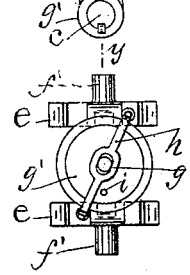
Witnesses:
H. A. Stoltenberg.
J. B. Hatch.
Inventor:
James R. Vellacott,
By Thomas G. Orwig,
Attorney.

UNITED STATES PATENT OFFICE.

JAMES R. VELLACOTT, OF DES MOINES, IOWA, ASSIGNOR OF ONE-HALF TO GEORGE LENDRUM, OF SAME PLACE.

VALVE AND VALVE-GEAR FOR STEAM-PUMPS.

SPECIFICATION forming part of Letters Patent No. 273,645, dated March 6, 1883.

Application filed November 13, 1882. (No model.)

*To all whom it may concern:*

Be it known that I, JAMES R. VELLACOTT, of Des Moines, in the county of Polk and State of Iowa, have invented an Improved Oscillating Valve and Valve-Operating Mechanism for Steam-Pumps, of which the following is a specification.

The object of my invention is to insure positive action and continuous operation in a direct-acting reciprocating pump at high or low speed, and to regulate the action of the valves, so as to compel the piston to begin each stroke slowly in order to avoid jars and concussion.

It consists, first, in forming and combining an oscillating valve with a cup in such a manner as to secure the advantages of a partially-balanced self-adjusting valve; second, in forming, arranging, and combining valve-operating mechanism in such a manner as to be always visible, and to operate automatically in actuating the valve when the piston has reached the end of its stroke, all as hereinafter fully set forth.

Figure 1 of my accompanying drawings is a vertical sectional view, showing my partially-balanced oscillating valve combined with a steam-cylinder. Fig. 2 is a transverse section of the steam-cylinder having my partially-balanced oscillating valve and valve-operating mechanism combined therewith, as required to be operated by a reciprocating piston in the cylinder. Fig. 3 is a side view of my valve-gear. Fig. 4 is a side view of the oscillating valve. Fig. 5 is a top view of the valve-stem or rock-shaft, and Fig. 6 is a side view of the same. Fig. 7 is a transverse section of the valve. Fig. 8 is a sectional view of the valve-gear attached to the cylinder. Fig. 9 is a side view of the valve-gear in a vertical position. Fig. 10 is a side view of the valve-gear in the position it assumes at or near the end of each backward stroke of the piston. Fig. 11 is a top view of the cylinder and piston shown in Fig. 9.

Jointly considered, these figures clearly illustrate the construction, application, and operation of my complete invention.

A represents a steam-cylinder.

$b$ represents an oscillating D-valve, having a cylindrical projection, $b'$, extending at right angles from the chord of the arc formed by the face of the valve.

$b''$ is an inverted cup fitted over the projection on the valve, and suspended by means of trunnions $b'''$, that rest in suitable bearings fixed to the steam-chest cover.

$c$ is a rock-shaft supported in suitable bearings formed in or fixed to the steam-chest covers. It has a bridle, $c'$, surrounding the combined valve and cup, and cams $c''$, extending downward to engage the shoulders or lugs $c'''$, formed on the valve, to apply the force necessary to move the valve at its face or line of resistance. As the shaft $c$ is rocked the valve is operated upon its center of motion as required to alternately open and close the steam-ports $a$ $a$.

$d$ $d$ represent a bracket fixed to the cylinder A to support my valve-operating mechanism.

$d'$ is a pitman or tappet rod running parallel with the cylinder. It rests and moves in guides or bearings formed on the bracket, and is operated by a tappet fixed to the reciprocating rod of the piston.

$d''$ is a fork formed on or fixed to the end of the pitman $d'$.

$d'''$ are slots in the branches of the fork $d''$, that engage the cross-head pin $d''''$, which passes through the end of a crank-arm that is fixed to the rock-shaft $c$.

$f$ represents a yoke supported by and operated on trunnions $f'$.

$f''$ is a cylinder fixed to or formed on the yoke.

$g$ is a rod passing vertically through the cylinder $f''$ and the yoke $f$. It has a piston, $g'$, fixed thereto to operate in the cylinder, and is formed on or fixed at its lower end to the cross-head $d''''$, to connect it with the crank-arm $g''$ and the fork $d''$ of the pitman $d'$, by means of the cross-head $d''''$, which extends into guides $e$ $e$, formed in the inside faces of the yoke $f$, to rise and fall therein as the yoke rocks on its trunnions. The crank-arm $g''$ is rigidly connected at its lower end with the rock-shaft $c$ and flexibly connected at its upper end with the rod $g$ and pitman $d'$ by means of the cross-head $d''''$.

$h$ is an equalizing-bar pivoted to the top end of the rod $g$.

$h'$ are coil-springs attached to the ends of the bar $h$ at their top ends, and to the yoke $f$ at their lower ends.

When the valve-operating mechanism is in the position shown by Fig. 10 and the pitman ready for moving in the direction of the arrow, the connected ends of the crank-arm and rod will be moved toward the line $y\,y$, and the yoke and cylinder moved in conjunction therewith by means of the cross-head $d''''$, working in the guides $e$, and as the cylinder assumes a vertical position the piston ascends in the cylinder, and the cylinder is filled with air admitted through the hole $i$ in the piston $g'$. After the ends of the crank-arm $g''$ and the center of the cross-head $d''''$ have passed the line $y\,y$ in the directions named, they are forced to a position opposite to that shown by Fig. 10 by the power exerted by the springs $h$. The piston is thus drawn into the cylinder and compresses the air between it and the top of the yoke, forming a cushion. The size of the vent $i$ in the piston through which air passes is regulated by a pointed screw or any other suitable device, and the speed at which the valve is operated thus changed as desired. A reverse motion of the pitman $d'$ actuates the yoke $f$, piston $g'$, and crank-arm $g''$ in the same manner as required to impart uniform successive motions to the oscillating valve $b$. As the pitman $d'$ is reciprocated and motion transmitted therefrom to rock the shaft $c$ the spaces between the lugs $c'''$ of the oscillating valve, into which spaces the cams $c''$ on the shaft extend, allow the valve to remain stationary and open long enough to permit the steam-pressure to move the piston and the pitman, and to press the valve-operating devices past the vertical line and dead-center $y\,y$. (Shown in Figs. 9 and 10.) Any steam that may leak through between the projection $b'$ and the cover $b''$ will readily escape through the opening that extends through that projection to connect it with the exhaust, and thus preserve the balance.

I claim as my invention—

1. The partially-balanced oscillating steam-valve $b$, having an open-ended cylindrical projection and exhaust-cavity $b'$, to admit waste steam from above, and lugs $c'''$, in combination with a cup or cover, $b''$, a rock-shaft, $c$, having a bridle, $c'$, and cams $c''$, substantially as shown and described, to operate in the manner set forth, for the purposes specified.

2. The pitman-rod $d'$, having a fork, $d''$, and slots $d'''$ in the branches of the fork, in combination with the rod $g$ of the piston and a crank-arm, $g''$, substantially as shown and described, for the purposes specified.

3. The pitman $d'$, having a fork, $d''$, and slots $d'''$ in the branches of the fork, the yoke $f$, having trunnions $f'$ and guides $e$, the rod $g$, having a cross-head pin, $d''''$, the spring $h'$, equalizing-bar $h$, and the crank-arm $g''$, arranged and combined substantially as shown and described, to operate in the manner set forth, for the purposes specified.

4. The rod $g$, having a piston, $g'$, and a cross-head, $d''''$, in combination with the yoke and cylinder $f\,f'\,f''$, mounted in the bracket $d\,d$, the pitman $d'\,d''\,d'''$, and the crank-arm $g''$, substantially as shown and described, to operate in the manner set forth, for the purposes specified.

5. The flexible self-adjusting valve-gear, composed of the following elements in combination, to wit: the pitman $d'\,d''\,d'''$, having bearings in a fixed bracket, $d\,d$, and connected with the rod of a steam-piston of a pump by means of a tappet-arm, the combined yoke and cylinder $f\,f'\,f''$, the piston-rod $g$, having a cross-head, $d''''$, the bar $h$, springs $h'$, and the crank-arm $g''$, fixed to a valve-operating shaft, $c$, substantially as shown and described.

JAMES R. VELLACOTT.

Witnesses:
G. V. WRIGHT,
GEO. Z. JARRETT.